July 5, 1932.  C. W. SHIELDS  1,865,973
FOOD COOKER
Filed Oct. 2, 1930  2 Sheets-Sheet 1

INVENTOR
C.W.Shields
BY Siggers & Adams
ATTORNEYS

July 5, 1932.   C. W. SHIELDS   1,865,973
FOOD COOKER
Filed Oct. 2, 1930    2 Sheets-Sheet 2
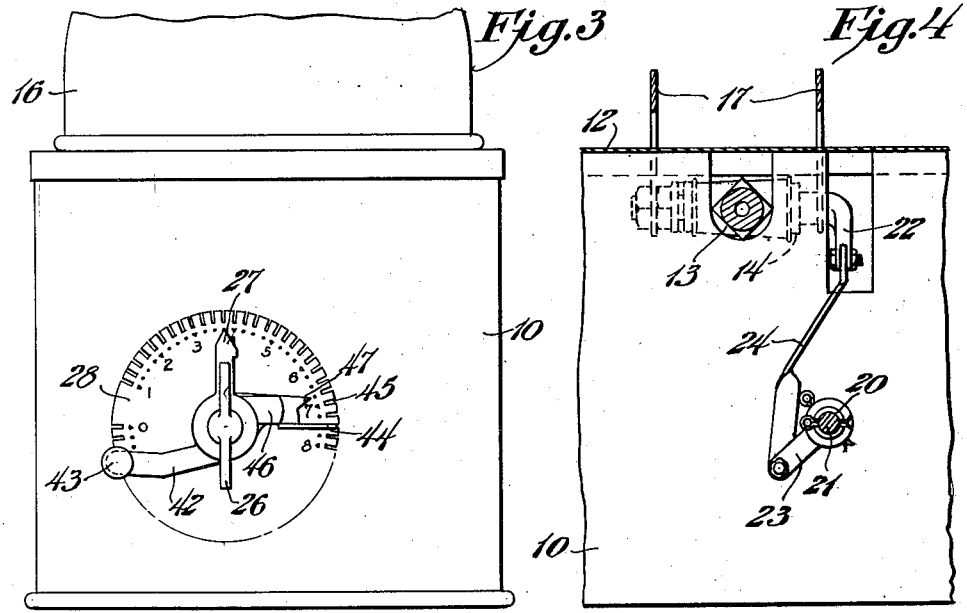
INVENTOR
C. W. Shields
BY
Siggers & Adams
ATTORNEYS Patented July 5, 1932

1,865,973

UNITED STATES PATENT OFFICE

CURTIS W. SHIELDS, OF NEW YORK, N. Y.

FOOD COOKER

Application filed October 2, 1930. Serial No. 485,976.

This invention relates to food cookers of the type utilizing steam or other suitable cooking medium, and, among other objects, aims to provide novel time controlled means for operating a closure for the cooking compartment and associated means to control the flow of the cooking medium when the closure is opened. Further, it aims to provide a very convenient device eminently adapted to cook eggs and the like for the desired time intervals.

Other aims and advantages of the invention will appear in the specification when considered in connection with the illustrative example thereof shown in the accompanying drawings, wherein:

Fig. 3 is a front elevation;

Fig. 4 is a fragmentary sectional view taken on the line 4—4 of Fig. 1;

Fig. 5 is a sectional view taken on the line 5—5 of Fig. 1, the timer parts being shown in a different position; and Fig. 6 is a view taken on the line 6—6 of Fig. 5.

Figure 1:
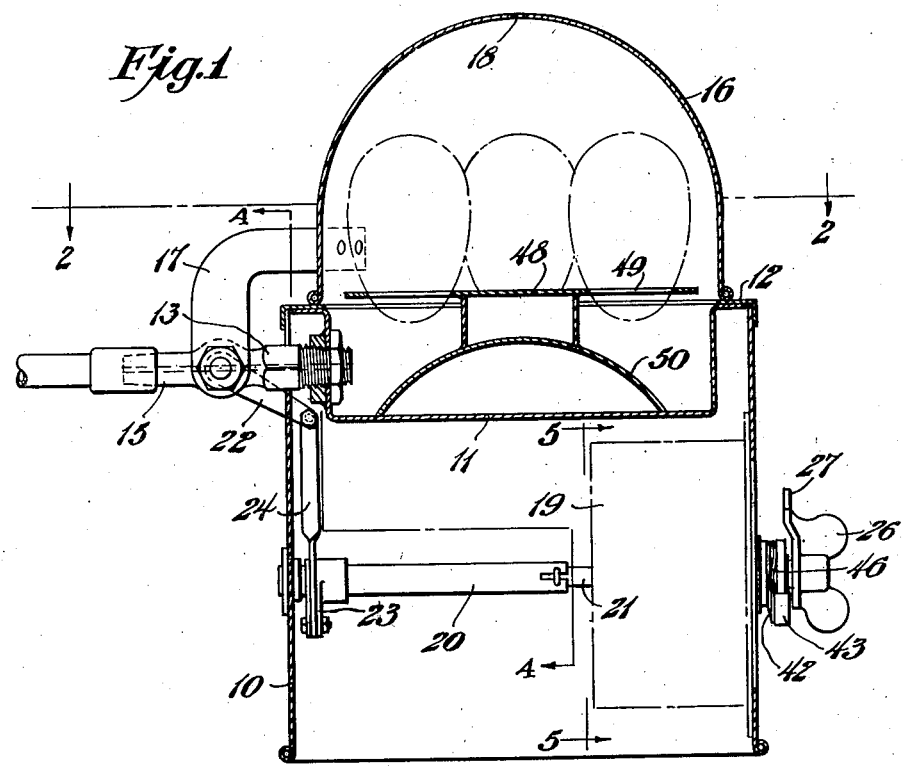
Fig. 1 is a vertical sectional view of a cooker embodying the invention.

Referring particularly to the drawings the illustrative cooker is there shown as having a box-shaped base 10, open at its lower end and adapted to rest on a table or the like and the height is such as to accommodate time-controlled mechanism later to be described. Within the upper end portion of the base there is mounted a suitably shaped cooking pan 11 which may be suitably secured to the upper end wall 12, this wall having an opening of the same size as the pan or vessel.

Connected to the pan there is shown a steam fitting 13 having a rotary plug valve 14 and a rear branch 15 adapted to be connected to any source of steam or cooking fluid.

A lid or cover 16 for the cooking compartment is shown as having brackets 17 connected to the plug valve 14 on opposite sides of the fitting 13. The arrangement is such that opening and closing movement of the valve operates the lid. When the valve is open the lid is closed over the cooker so that steam is injected into the cooking compartment, a small vent opening 18 being provided in the lid to permit some steam to escape and prevent the pressure from increasing in the compartment. When the lid is open to expose the cooked food the valve is closed to cut off the steam or cooking medium.

In accordance with this invention, any suitable interval timer 19, herein illustrated as being of the well known "Kwixset" type, is operatively connected to the valve and so arranged that when the timer is set for the desired interval, the valve opens and closes the lid. Also, the mechanism includes means normally urging the valve to close and thereby open the lid and trigger latch means adapted to be cocked when the valve is open and arranged to be released when the power spring of the timer propels the timer mechanism to its home position or after the time interval has elapsed.

In this example, a shaft 20 is journaled inside of the cooker base and suitably connected at its forward end to an operating shaft 21 of the timer (Fig. 1) and the shaft 20 is operatively connected to a crank arm 22 on one end of the plug valve by means of a crank arm 23 and a bent link 24. The arrangement is such that the valve be rotated through about 60 degrees so that the lid will be opened sufficiently wide to afford accesss to the cooking compartment for insertion and removal of eggs or other food.

The illustrative timer is covered broadly in pending applications and patents of Raymond D. Smith and requires no particular description. It includes spring-driven, clock escapement mechanism having a winding stem 25 projecting through the front walls of the base or casing of the cooker and a winding handle 26 and carrying a pointer 27 cooperating with a dial 28. The arrangement is such that when the winding handle is turned so that the pointer indicates the desired time interval, the mechanism also rotates the operating shaft to close the cooker lid and open the valve.

In this example, the timer has a cam disk 29 to which is connected an L-shaped arm 30 arranged to turn the shaft 21 by engaging a pivoted dog 31 on a rocker arm 32 fixed on the shaft 21. The dog is conveniently struck out of sheet metal and has a projection 33 bent at right angles to engage the end of the arm, as shown in Fig. 5, and limit its swinging movement with respect to the arm. The arrangement is such that the arm 30 on the cam, when turned counterclockwise in Fig. 5, will engage the dog and push it and the arm 32 clockwise past the cocking position, shown in Fig. 5, until the dog swings out of the path of arm 30. Then, the L-shaped arm 30 may rotate back past the dog 31 by pushing it counterclockwise on its own pivot. When the timer parts are in position shown, the pointer 27 will be between 1 and 2 on the dial instead of the position shown in Figs. 1 and 3.

The rocker arm 32 is shown as extending across the shaft 21 and has a bracket 34 on one side to which a tension spring 35 is connected normally tending to turn the shaft 21 counterclockwise, as viewed in Fig. 5. Also, the arm 32 has a hook-shaped end 36 adapted to be engaged by a specially shaped trigger 37 pivoted on a stationary part of the timer, so as to hold the parts cocked. A bent leaf spring 38 urges the trigger to snap into locking or cocked position and preferably has a curved horn or projection 39, which, when the trigger is cocked, projects into the path of cam arm 30 so that the arm will release the trigger and permit the spring 35 to operate the shaft 21. The trigger is released or tripped when the pointer 27 on the clock winding handle reaches its home or zero position on the dial. The lid of the cooker is snapped open and the steam is automatically cut off by the valve. The counterclockwise movement of the rocker arm 32 is limited by a suitable projection or stud 40 mounted in the hook-shaped end 36 of arm 32 engaging the edge 41 of an arcuate slot in the timer frame.

A rotary arm 42 is shown as being mounted on a projection of the bearing for the winding shaft and has a handle 43 at one end and a tongue or finger 44 at the other end which is adapted to be pressed into any one of a series of peripheral notches 45 in the dial and locked in this position so that the pointer arm 27 will strike the upstanding fin portion of finger 44. A leaf spring 46 is arranged normally to press and hold the finger 44 in one of the notches. To set the arm it is only necessary to push inwardly on the knob 43 to release the finger from its notch in the dial and rotate it until a pointer 47 indicates the desired time interval. This pointer will lie directly behind the pointer 27 when the latter is stopped by finger 44.

Figure 2:
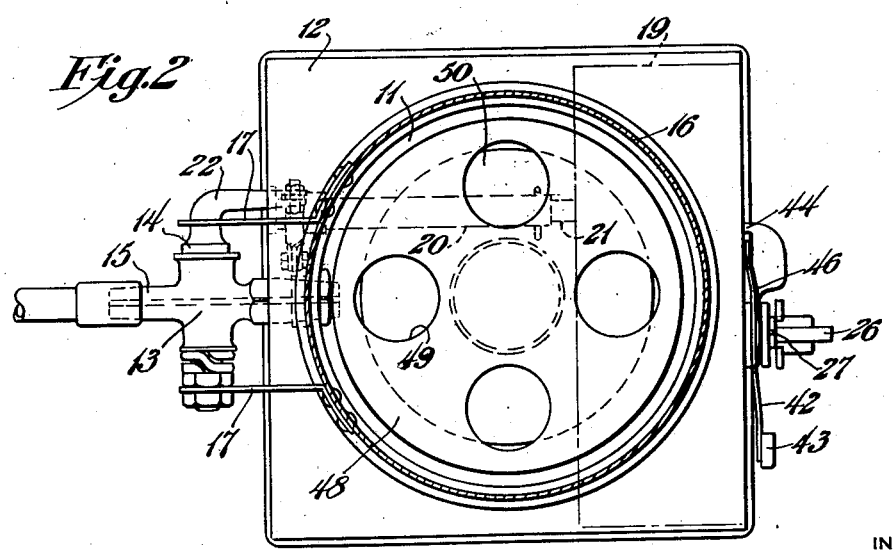
Fig. 2 is a sectional view taken on the line 2—2 of Fig. 1.

As has already been stated, the device is eminently adapted to cook eggs to order. In Figs. 1 and 2, there is shown a composite utensil for holding eggs either in the shell for boiling or in a pan for poaching. It comprises a disk 48 having means to support eggs in their shells, herein in the form of openings 49 in which the eggs may be set on end, as shown, so as to be exposed to the action of the steam and easily accessible for removal. Also, this disk may be used to support other foods. It is shown as being connected to an inverted bowl-shaped pan 50 which not only acts as a supporting base, but is also adapted to be used for cooking eggs or other foods when the utensil is reversed or turned upside down. Then the portion 48 acts as the supporting base. Thus, the main pan or cooking compartment never has to come in contact with or be soiled by the food when the holder 48—50 is used. However, it can be used without the holder.

From the foregoing description, it will be understood that the cooker is eminently adapted for restaurant and household use. It dispenses with the necessity of timing the cooking by watching a clock and leaves a cook or attendant free to do other useful work, as it functions automatically. The cooking ceases at the proper time, even though the attendant fails to return to remove the food, thus, preventing spoilage of food by overcooking. Further, the device consumes only the required amount of steam or cooking medium and thereby effects a great saving in fuel. It is very compact and requires very little counter or other space for cooking ordinary foods. The provision for the escape of a small quantity of steam during the cooking period makes the cooker perfectly safe. Moreover, it has a very attractive appearance and is reliable in operation.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:

1. A food cooker comprising, in combination, a cooking compartment having a cover; means to admit a fluid cooking medium to the compartment; a valve controlling the supply of the cooking medium; and a single timer mechanism connected to operate both the valve and cover after a predetermined time.

2. A food cooker comprising, in combination, a cooking compartment having a cover; means to admit a fluid cooking medium to the compartment; a valve controlling the supply of the cooking medium; and means connected to operate the valve and cover automatically and simultaneously after a predetermined time.

3. A food cooker comprising, in combination, a cooking compartment having a cover; means to admit a fluid cooking medium to the compartment; a valve controlling the supply of the cooking medium; and means connected to close the valve and open the cover simultaneously and automatically after a predetermined time.

4. A food cooker comprising, in combination, a cooking compartment having a cover; means to admit cooking fluid to the compartment; a cock controlling the admission of the fluid and having a plug; a pair of brackets connecting the plug to the cover; and time-controlled means connected to close the cock and thereby simultaneously open the cover to expose the cooked food.

5. A food cooker comprising, in combination, a cooking compartment having a hinged cover; means to admit cooking fluid to the compartment; a rotary valve controlling the admission of the fluid having a plug constituting the hinge for the cover; and a timer associated with the cooker and having timer-controlled mechanism operatively connected to the valve to shut off the cooking fluid and open the cover after a predetermined time.

6. A food cooker comprising, in combination, a cooking compartment having a hinged cover; means to admit cooking fluid to the compartment; a rotary valve controlling the admission of the fluid having a plug constituting the hinge for the cover; a timer outside of the cooking compartment; a valve operating shaft connected to the timer; and operating connections between the shaft and the valve arranged to close the valve and simultaneously open the cover after a predetermined time.

7. A food cooker comprising, in combination, a base; a cooking pan in the base; a steam conduit connected to the pan; a rotary valve to control the admission of steam; a cover for the cooking pan connected to the valve and operable therewith; a timer in the base; a valve operating shaft journaled in the base and connected to the timer mechanism; a crank arm on the shaft; an arm on the valve extending into the base; and links connecting said arms.

8. A food cooker comprising, in combination, a base; a cooking pan supported by the base; a steam conduit connected to the pan; a valve to control the admission of steam; a cover for the cooking pan mounted in said valve and connected to move therewith; a timer; and connections between said timer and said valve also arranged in said base.

9. In a food cooker of the character described, a cooking compartment; a conduit connected to admit cooking fluid to the compartment, a valve in said conduit to control the admission of cooking fluid to said compartment; and a cover hinged on said valve and so arranged as to be opened to afford access to cooked food when the valve is closed.

10. A food cooker of the character described comprising, in combination, a base; a cooking pan within the base; a steam conduit leading into the cooking pan; a valve in the conduit; a cover for the cooking pan; and means connecting the cover to be operated with said valve so that when the cover is opened, the valve will be closed to shut off the supply of steam.

11. A food cooker of the character described comprising, in combination, a cooking compartment including a pan; a steam conduit communicating with said compartment; a rotary plug valve in said steam conduit; a cover for said compartment; and means connecting said cover to said plug valve whereby the cover and the valve may be operated simultaneously.

In testimony that I claim the foregoing as my own, I have hereto affixed my signature.

CURTIS W. SHIELDS.